(12) United States Patent
Khadiwala et al.

(10) Patent No.: US 10,592,109 B2
(45) Date of Patent: Mar. 17, 2020

(54) SELECTING STORAGE RESOURCES IN A DISPERSED STORAGE NETWORK

(71) Applicant: International Business Machines Corporation, Armonk, NY (US)

(72) Inventors: Ravi V. Khadiwala, Bartlett, IL (US); Jason K. Resch, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 0 days.

(21) Appl. No.: 16/151,632

(22) Filed: Oct. 4, 2018

(65) Prior Publication Data

US 2019/0034086 A1    Jan. 31, 2019

Related U.S. Application Data

(63) Continuation-in-part of application No. 15/841,759, filed on Dec. 14, 2017, now Pat. No. 10,140,182, (Continued)

(51) Int. Cl.
*G06F 3/06* (2006.01)
*G06F 11/10* (2006.01)
(Continued)

(52) U.S. Cl.
CPC ............ *G06F 3/0604* (2013.01); *G06F 3/067* (2013.01); *G06F 3/0619* (2013.01); *G06F 3/0631* (2013.01); *G06F 3/0635* (2013.01); *G06F 3/0644* (2013.01); *G06F 3/0659* (2013.01); *G06F 3/0661* (2013.01); *G06F 11/1076* (2013.01); *G06F 11/1092* (2013.01); *G06F 21/62* (2013.01); *G06F 21/64* (2013.01);
(Continued)

(58) Field of Classification Search
CPC combination set(s) only.
See application file for complete search history.

(56) References Cited

U.S. PATENT DOCUMENTS 4,092,732 A     5/1978   Ouchi
5,454,101 A     9/1995   Mackay et al.
(Continued)

OTHER PUBLICATIONS

Chung; An Automatic Data Segmentation Method for 3D Measured Data Points; National Taiwan University; pp. 1-8; 1998.
(Continued)

*Primary Examiner* — Shelly A Chase
(74) *Attorney, Agent, or Firm* — Garlick & Markison; Timothy W. Markison; Bruce E. Stuckman

(57) ABSTRACT

A method for execution by a dispersed storage and task (DST) client module includes determining a storage unit performance level for storage units of a set of storage units. Storage resources of the set of storage units are temporarily selected based on the storage unit performance levels to produce identities of candidate primary storage slots. Identities of candidate primary storage slots are exchanged with another DST client module. Selection of primary storage slots of the candidate primary storage slots is coordinated with the other non-transitory computer readable storage medium to produce identities of selected primary storage slots. Data stored in the set of storage units is accessed using the selected primary storage slots.

20 Claims, 6 Drawing Sheets

Related U.S. Application Data which is a continuation-in-part of application No. 15/450,470, filed on Mar. 6, 2017, now Pat. No. 9,891,829, which is a continuation of application No. 14/589,639, filed on Jan. 5, 2015, now Pat. No. 9,665,429.

(60) Provisional application No. 61/944,722, filed on Feb. 26, 2014.

(51) Int. Cl.

| | | |
|---|---|---|
| *H04L 29/06* | (2006.01) | |
| *H03M 7/30* | (2006.01) | |
| *H04L 9/08* | (2006.01) | |
| *G06F 21/64* | (2013.01) | |
| *H04L 29/08* | (2006.01) | |
| *G06F 21/62* | (2013.01) | |
| *H03M 13/15* | (2006.01) | |
| *H03M 13/00* | (2006.01) | |

(52) U.S. Cl.
CPC ........... *H03M 7/6011* (2013.01); *H04L 9/085* (2013.01); *H04L 9/0894* (2013.01); *H04L 63/10* (2013.01); *H04L 63/101* (2013.01); *H04L 63/102* (2013.01); *H04L 67/1097* (2013.01); *H04L 67/2823* (2013.01); *G06F 2211/1028* (2013.01); *G06F 2212/254* (2013.01); *H03M 13/1515* (2013.01); *H03M 13/616* (2013.01); *H04L 63/12* (2013.01); *H04L 2209/30* (2013.01); *H04L 2209/34* (2013.01); *H04L 2209/608* (2013.01)

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,103,824 B2 | 9/2006 | Raiford |
| 7,103,915 B2 | 9/2006 | Redlich et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,636,724 B2 | 12/2009 | de la Torre et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters et al. |
| 2009/0094251 A1 | 4/2009 | Gladwin et al. |
| 2009/0094318 A1 | 4/2009 | Gladwin et al. |
| 2009/0144516 A1 | 6/2009 | Sandorti |
| 2010/0023524 A1 | 1/2010 | Gladwin et al. |
| 2011/0072321 A1 | 3/2011 | Dhuse |
| 2011/0214011 A1 | 9/2011 | Grube et al. |
| 2011/0225362 A1 | 9/2011 | Leggette |
| 2011/0311051 A1 | 12/2011 | Resch et al. |
| 2012/0054456 A1 | 3/2012 | Grube et al. |
| 2012/0102316 A1 | 4/2012 | Resch et al. |
| 2012/0110390 A1 | 5/2012 | Grube et al. |
| 2012/0137091 A1 | 5/2012 | Grube et al. |
| 2013/0138862 A1* | 5/2013 | Motwani ................ H04L 65/10 711/5 |
| 2014/0189236 A1* | 7/2014 | Li ........................... G06F 3/061 711/114 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association or Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

(56) References Cited

OTHER PUBLICATIONS

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

\* cited by examiner

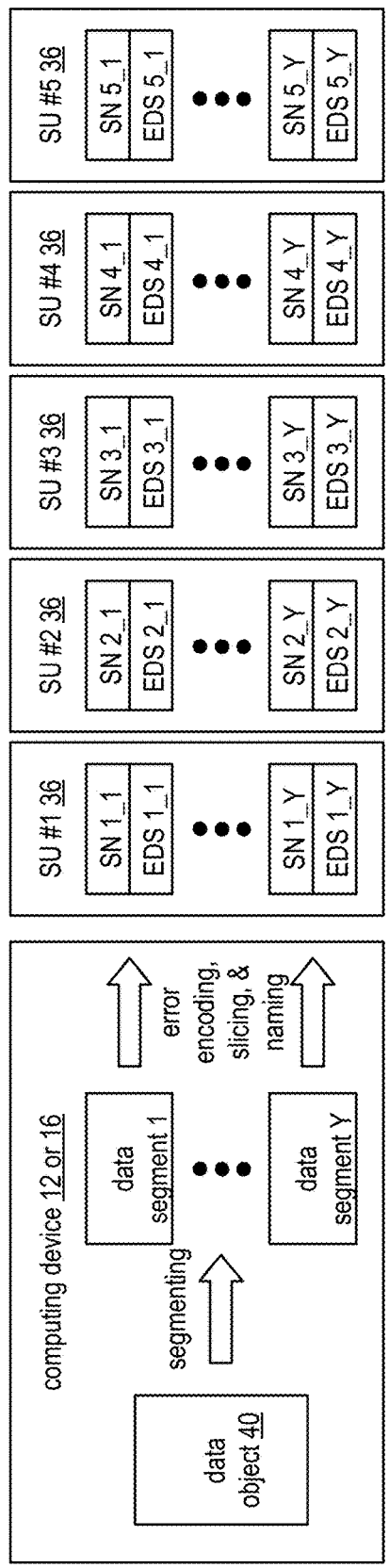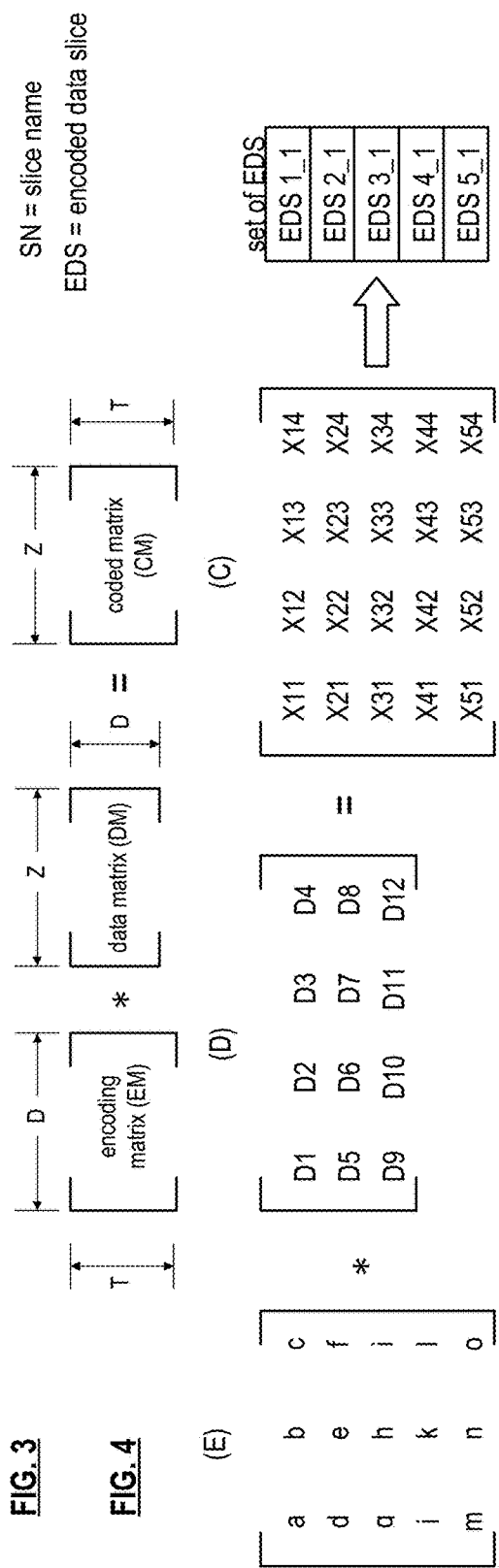

SELECTING STORAGE RESOURCES IN A DISPERSED STORAGE NETWORK

CROSS-REFERENCE TO RELATED APPLICATIONS

The present U.S. Utility patent application claims priority pursuant to 35 U.S.C. § 120 as a continuation-in-part of U.S. Utility application Ser. No. 15/841,759, entitled "MODIFYING ALLOCATION OF STORAGE RESOURCES IN A DISPERSED STORAGE NETWORK", filed Dec. 14, 2017, which is a continuation-in-part of U.S. Utility application Ser. No. 15/450,470, entitled "STORAGE OF DATA WITH VERIFICATION IN A DISPERSED STORAGE NETWORK", filed Mar. 6, 2017, issued as U.S. Pat. No. 9,891,829 on Feb. 13, 2018, which is a continuation of U.S. Utility application Ser. No. 14/589,639, entitled "STORAGE OF DATA WITH VERIFICATION IN A DISPERSED STORAGE NETWORK", filed Jan. 5, 2015, issued as U.S. Pat. No. 9,665,429 on May 30, 2017, which claims priority pursuant to 35 U.S.C. § 119(e) to U.S. Provisional Application No. 61/944,722, entitled "SELECTING RESOURCES OF A DISPERSED STORAGE NETWORK", filed Feb. 26, 2014, all of which are hereby incorporated herein by reference in their entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
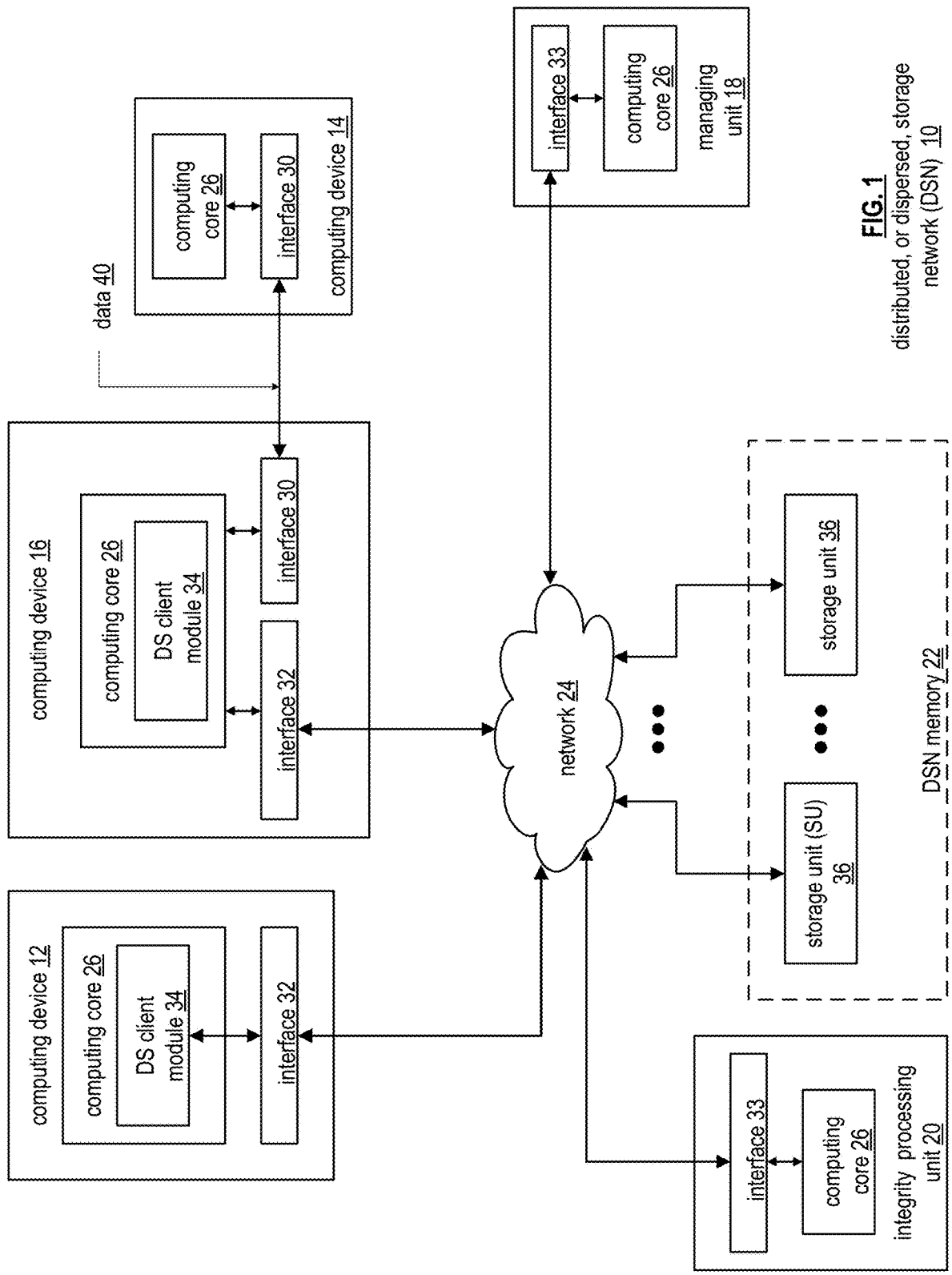
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
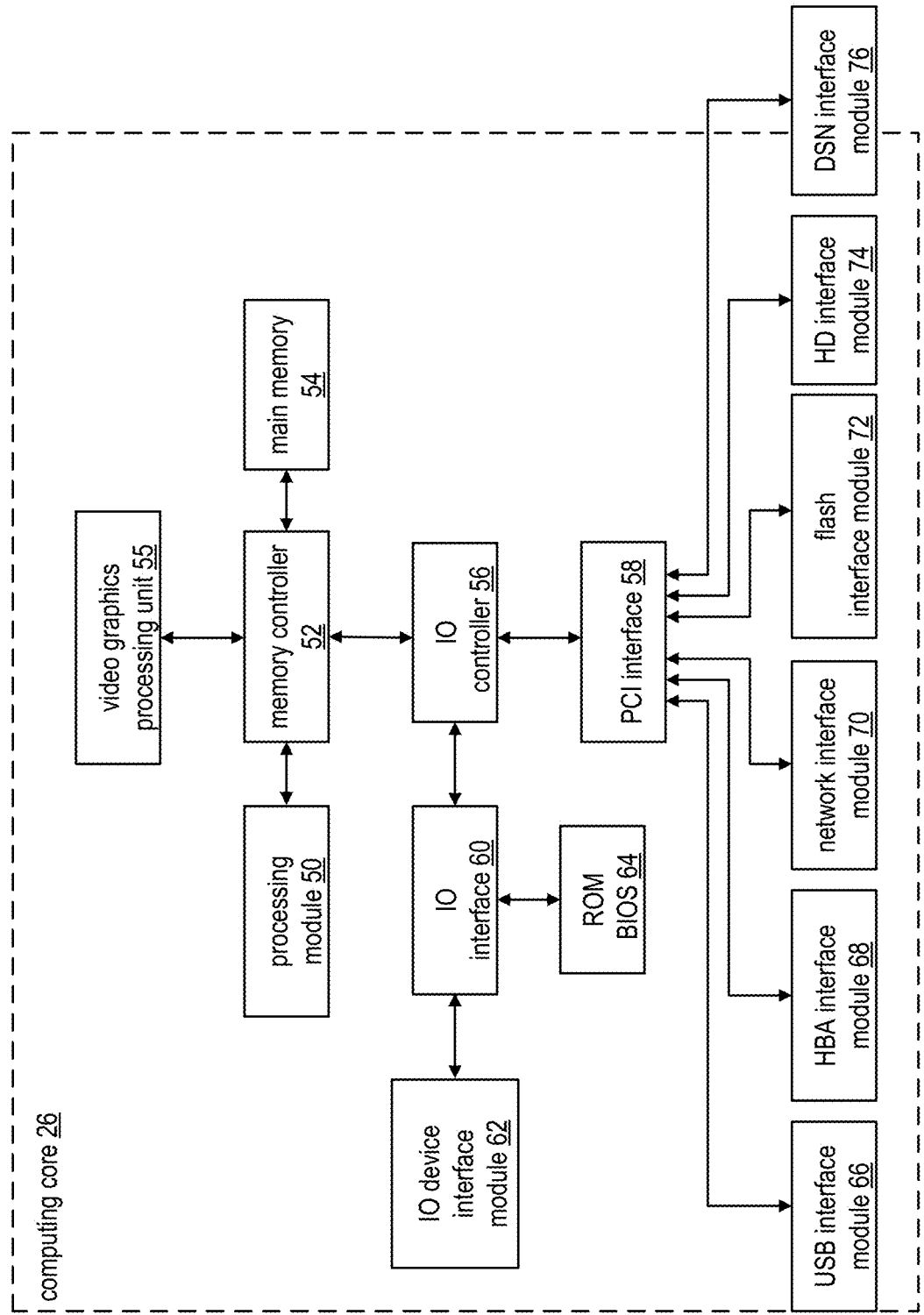
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a dispersed storage and task (DST) execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36. In various embodiments, computing devices 12-16 can include user devices and/or can be utilized by a requesting entity generating access requests, which can include requests to read or write data to storage units in the DSN.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
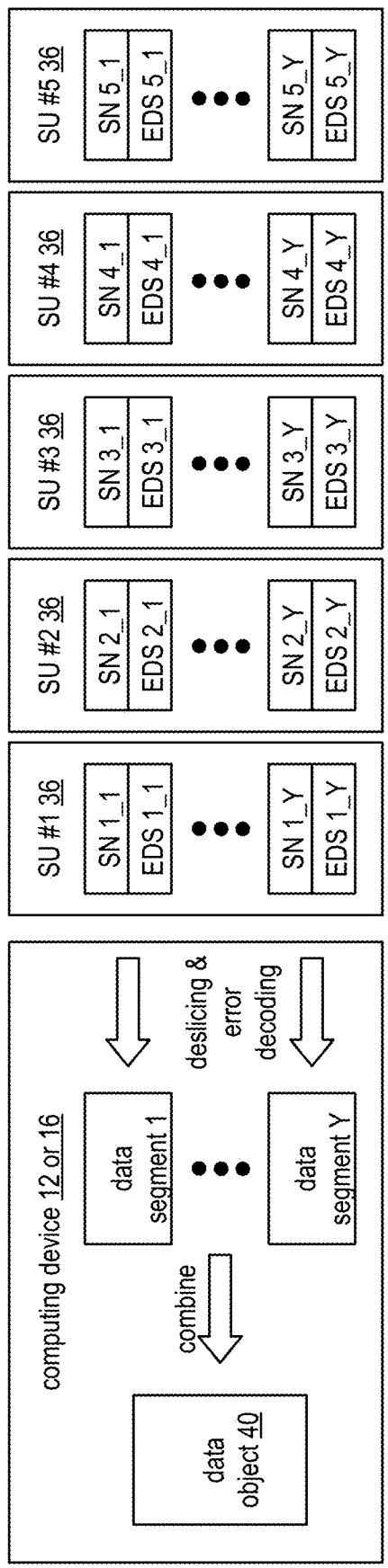
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
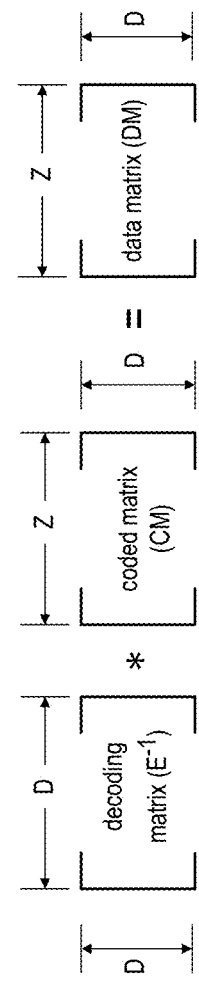
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
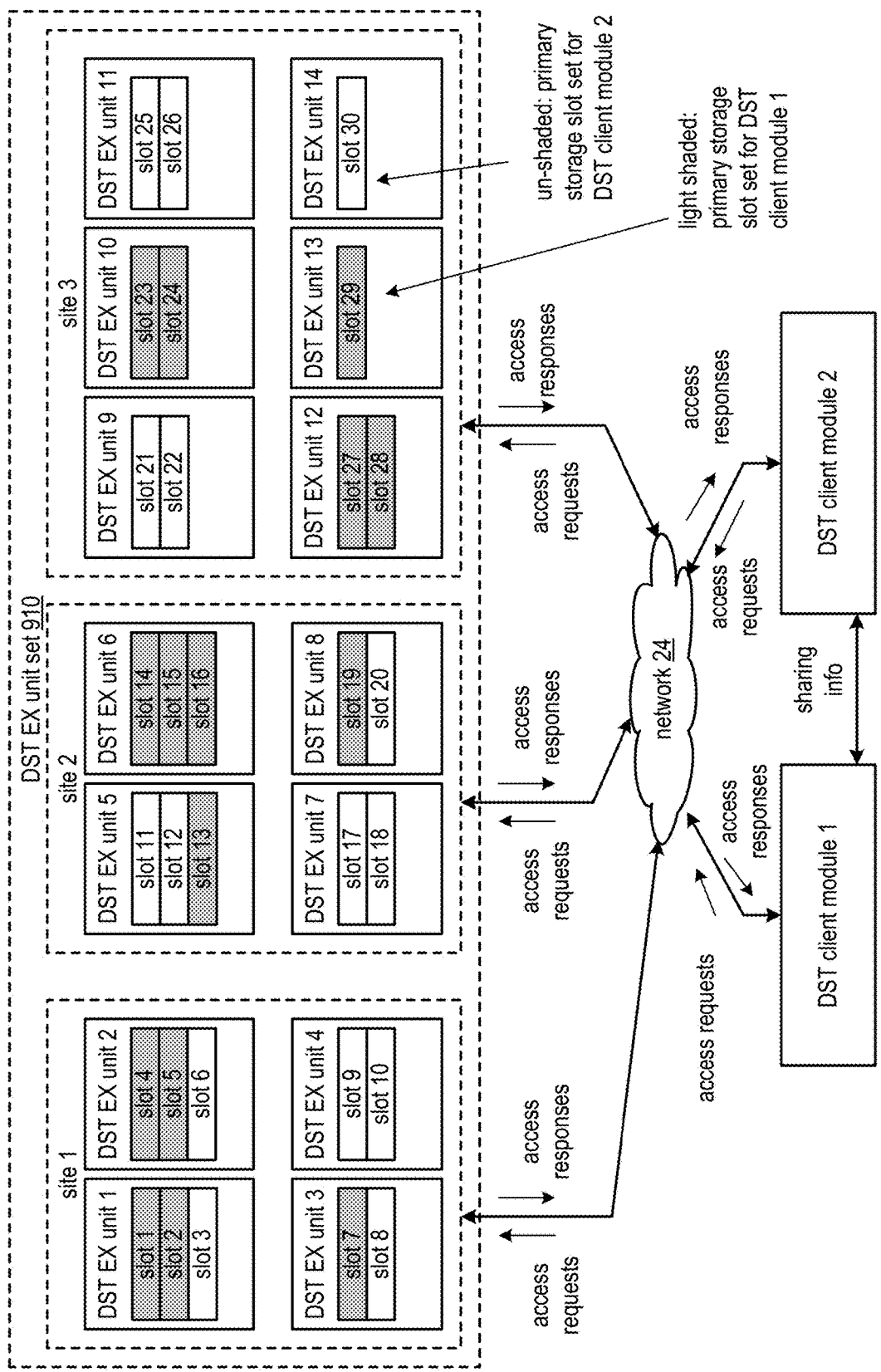
FIG. 9 is a schematic block diagram of an embodiment of a dispersed or distributed storage network (DSN) in accordance with the present invention.

FIG. 9 is a schematic block diagram of an embodiment of a dispersed storage network (DSN) that includes at least two distributed storage and task (DST) client modules 1-2, the network 24 of FIG. 1, and a DST execution (EX) unit set 910. The DST client modules 1-2 can be implemented using the DS client module 34 of FIG. 1, and can be client modules of computing devices 16 of FIG. 1 operating as dispersed storage and task processing units. The DST execution unit set 910 can be implemented by utilizing one or more storage units 36 of FIG. 1. One or more DST execution units are deployed at one or more sites, and some or all of the DST execution units can be operating at differing performance levels. Each DST execution unit provides at least one storage slot of N storage slots. A storage slot includes a virtual storage location associated with physical memory of the DST execution unit. For example, the DST execution unit set includes DST execution units 1-14 when 30 storage slots are provided and a varying number of storage slots are associated with each DST execution unit. The DSN functions to select storage resources and to access the storage resources to facilitate storing and retrieving of data. Storage resources includes one or more of the storage slot and a DST execution unit. In particular, the DSN functions to allocate slots to DST execution units to achieve toleration of DST execution unit failures.

Consider multiple dispersed storage and task (DST) processing units of a DSN attempting to achieve optimum performance, such as DST processing units implemented by two computing devices 16 and/or that utilize DST client modules 1 and 2. Multiple DST processing unit must take care to not "starve" each other out by consuming all of the resources of the fastest DST execution units while leaving only slow or poorly performing DST execution units for other DST processing units or other elements of the system accessing the DST execution units. If all DST processing units selfishly attempt to use the best performing DST execution units, then they may soon become overloaded and as bad or worse than the poorly performing DST execution units. Therefore, two or more DST processing units may enter a "sharing agreement." In this case, DST processing units can periodically trade off at least some sub-set of the highest performing DST execution units, while at other times using the lower performing DST execution units. Overall throughput is higher with coordination: otherwise, DST processing units constantly collide trying to use the fastest DST execution units, and no DST processing unit achieves good performance at any point.

In some embodiments, DST processing units that form these sharing groups typically should be in physical proximity or have similar networking characteristics, as in a geo-dispersed system, widely separated DST processing units may have entirely different views of which DST execution units are well performing and which ones are poorly performing. For example, one group of DST processing units on the west coast, and another group of DST processing units the east coast, the cooperative groups and trading off may only occur between DST processing units on one particular coast.

In an example of operation of the selecting of the storage resources, the DST client module 1 can obtain dispersal parameters. The dispersal parameters can include one or more of a number of storage slots N, an information dispersal algorithm (IDA) width number, a write threshold number, a read threshold number, and/or a decode threshold number. The obtaining can include at least one of retrieving a portion of system registry information, utilizing a predetermination, determining based on the desired performance level indicator, and/or accessing a list based on the requesting entity ID.

Having obtained the dispersal parameters, the DST client module 1 can determine a DST execution unit performance level for each DST execution unit of the DST execution unit set. The determining can include at least one of interpreting an error message, performing a lookup, initiating a performance test, and/or interpreting a performance test result. The performance level can include indicators for one or more performance metrics. The one or more performance metrics can include at least one of an input/output bandwidth level, a storage latency level, a retrieval latency level, a transfer rate level, a data retrieval reliability level, and/or a data storage availability level.

Having determined the DST execution unit performance levels for the DST execution unit set, the DST client module 1 can temporarily select a set of primary storage slots of N storage slots associated with the DST execution unit set to produce a set of identities of candidate primary storage slots, where the set of storage slots includes at least a decode threshold number of storage slots and at most an IDA width number of storage slots. The selecting can be based on one or more of the DST execution unit performance levels, a storage slot to DST execution unit mapping, site availability information, system topology information, a system loading level, a system loading goal level, a data storage availability goal, a data retrieval reliability goal, and/or a site selection scheme.

As a specific example, the DST client module 1 can temporarily select the IDA width number of storage slots out of the N storage slots as primary storage slots. As such, the DST client module 1 selects one combination out of a number of combinations expressed by a formula: number of combinations of the selecting of the IDA width number of storage slots is N choose IDA width. For instance, when N=30 and the IDA width=15, the number of combinations of selecting the IDA width number of storage slots is equal to 30 choose 15, which is equal to 155 million combinations. Storage of data within the DST execution unit set can tolerate a number of storage slot failures and/or unavailability without affecting data storage availability and data retrieval reliability in accordance with a formula: number of storage slot failures tolerated is N minus IDA width, which is computed as 30 minus 15 in this example. As such, the storage of data within the DST execution unit set can tolerate 15 storage slot failures. Such an embodiment can be utilized, for example, for the application of writing data to select which resources will be utilized to store slices for one or more data segments, and/or in coordinating selection of resources utilized to store multiple data segments across multiple DST client modules.

The DST client module can temporarily select the IDA width number of storage slots in accordance with the site selection scheme to improve the data retrieval reliability. For example, the DST client module 1 selects storage slots at each site of the one or more sites such that at least a decode threshold number of encoded data slices are available from available storage slots at a minimum desired number of sites. As a specific example, DST client module 1 selects storage slots associated with available and better-than-average performing DST execution units such that the decode threshold number of encoded data slices are available from any two operational sites when one of three total sites is unavailable. For instance, FIG. 9 illustrates 30 storage slots distributed amongst 14 DST executions units located across 3 different physical sites. The DST client module 1 can select 5 storage slots at each of the 3 sites when the IDA width is 15 and the decode threshold is 10.

As another example, the DST client module 1 can temporarily select an IDA decode threshold number of storage slots to recover a data segment, for example, in conjunction with a read operation. In such embodiments, the decode threshold number of storage slots can be selected from the IDA width number of storage slots that store a data segment indicated to be read. The number of combinations of selecting the IDA decode threshold number of storage slots for a particular data segment can be equal to the IDA width number choose the IDA decode threshold number.

Having temporarily selected the set of primary storage slots, the DST client module 1 can issue sharing information to the other DST client module of the at least two DST client modules 1-2. The sharing information includes the identities of the temporarily selected candidate set of primary storage slots by one or more of the DST client modules. For example, the DST client module 1 generates the sharing information to include the identities selected by the DST client module 1 of the temporarily selected candidate set of primary storage slots and sends the sharing information to the DST client module 2. The sending may be direct or via the network 24.

Having sent the sharing information, the DST client module 1 can receive sharing information from the DST client module 2, where the sharing information received from the DST client module 2 includes other identities selected by the DST client module 2 of temporarily selected candidate set of primary storage slots. Having shared the sharing information generated by each of the at least two DST client modules 1-2, the at least two client modules 1-2 can coordinate selection of at least some of the candidate primary storage slots to produce selected primary storage slots. For example, the DST client modules 1-2 exchange further sharing information messages and perform a narrowing function to coordinate the selection. The narrowing function can include at least one of randomly selecting storage resources when the storage resources produce similar performance results, selecting other storage resources associated with one of the DST client modules when estimated associated performance of the one of the DST client modules is greater than a performance threshold level, allowing overlapping selections, and/or not allowing overlapping selections. For example, the DST client modules 1-2 select storage slot 29 of DST execution unit 13 as a primary storage slot for the DST client module 1 and select storage slot 30 of DST execution unit 14 as a primary storage slot for the DST client module 2 when the performance level of the DST execution unit 13 is better for the DST client module 1 than the DST client module 2 and the performance level of the DST execution unit 14 is better for the DST client module 2 than the DST client module 1. In some embodiments, the selection of the primary storage slots for each DST client module is established as an IDA width number of primary storage slots for each DST client module. In some embodiments, the selection of the primary storage slots for each DST client module is established as an IDA decode threshold number of primary storage slots for each DST client module.

In some embodiments, the selection of the primary storage slots for some or all DST client modules includes selecting a proper subsets of the temporary primary storage slots. For example, the set of temporary primary storage slots for each client module can include a number of storage slots that is at least the IDA width number and no more than N, and the final selection can be reduced to the IDA width number. As another example, the set of temporary primary storage slots for some or all client modules can include only some or all storage slots that store data slices of a requested data segment, where the size of the set of temporary primary storage slots is at least the IDA decode threshold number and no more than the IDA width number. In such cases, and the final selection can be reduced to the IDA decode threshold number of storage slots for each DST client module.

In other embodiments, the size of the set of temporary primary storage slots and the size of the set of selected primary storage slots is the same for some or all DST client modules. In such embodiments, at least one of the storage slots can be removed from the set of temporary storage slots to generate the set of selected primary storage slots, and a same number of other storage slots that were not in the set of temporary storage slots can be added to generate the set of selected primary storage slots. In particular, at least one storage slot can be "swapped" by the DST client modules. A number of storage slots of the temporary set of primary storage slots of DST client module 1 are removed to generate the selected set of primary storage slots of DST client module 1, and are added to the selected set of primary storage slots of DST client module 2. The same or different number of storage slots can be removed from the temporary set of primary storage slots DST client module 2 to generate the selected set of primary storage slots of DST client module 2, and are added to the selected set of primary storage slots of DST client module 1. In some embodiments, one or more storage slots that were in neither temporary set of primary storage slots of DST client module 1 or 2 are determined to be added to the selected set of primary storage slots of DST client module 1 and/or the selected setoff primary storage slots of DST client module 2 in the sharing process.

In some embodiments, for example where the set of storage slots is selected for a data segment to be read in conjunction with a read operation for DST client module 1, the sharing of information can correspond to DST client module 2 performing operations on the same data segment. The result can include DST client module 1 and DST client module 2 determining to utilize different sets of decode threshold number of storage slots from the IDA width number of storage slots storing slices of the data segment. In particular, they can determine to utilize sets with an overlap of a smallest possible number of storage slots. In some embodiments, the sharing of information corresponds to DST client module 2 performing operations on different data that share some or all of the same resources.

In some embodiments, a selected set of storage slots can be determined by a DST client module for each of a plurality of stored data segments by utilizing this coordinated selection process with other DST client modules. Each selected set of storage slots can correspond to a decode threshold number of storage slots for each data segment. This information can be stored by the DST client module to be utilized in subsequent read operations. For a given data segment in a subsequent read operation, the same, previously selected set of storage slots can be utilized by the DST client module without repeating the sharing process.

Alternatively or in addition, the coordinated selection process can be repeated to determine new selected sets of storage slots for some or all data segments periodically in fixed time intervals; in response to determining resource availability and/or other resource conditions have changed; each time a data segment is accessed; and/or in response to another determination. Similarly, the coordinated selection process for a set of resources utilized for writing data or other types of data access can also be repeated for some or all DST client modules to determine new selected sets of storage slots periodically in fixed time intervals; in response to determining resource availability and/or other resource conditions have changed; each time data is written; and/or in response to another determination.

Having coordinated the selection of the primary storage slots for each DST client module, each DST client module can access the DST execution unit set in accordance with a selected associated set of primary storage slots. For example, DST client module 1 issues, via the network 24, access requests (e.g., write slice request, read slice request, list slice request, delete slice request, etc.) to DST execution units associated with storage slots 1, 2, 4, 5, 7, 13, 14, 15, 16, 19, 23, 24, 27, 28, and 29 when selecting an IDA width number of primary storage slots and DST client module 2 issues, via the network 24, access requests to DST execution units associated with storage slots 3, 6, 8, 9, 10, 11, 12, 17, 18, 20, 21, 22, 25, 26, and 30 when selecting a non-overlapping IDA width number of primary storage slots. At least some of the DST execution units issue, via the network 24, access responses (e.g., a write slice request, a read slice request, a list slice request, a delete slice request, etc.) to the DST client modules 1-2 in response to receiving associated access requests.

Figure 10:
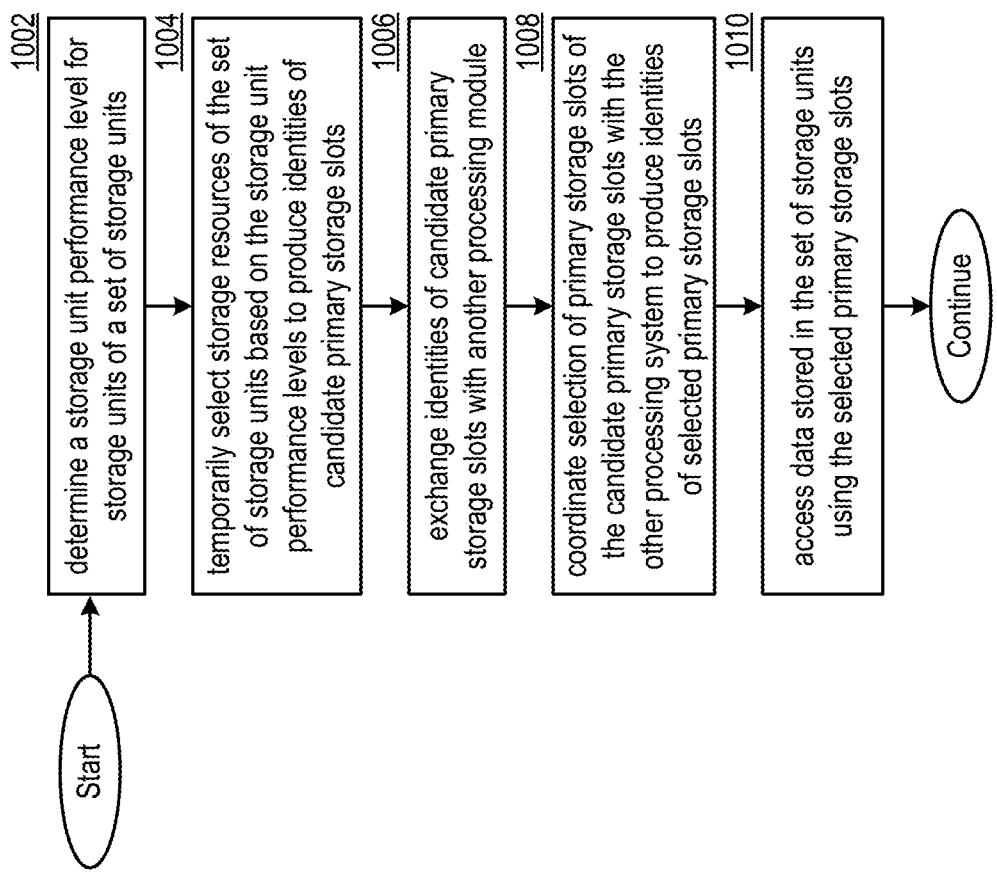
FIG. 10 is a logic diagram of an example of a method of selecting storage resources in accordance with the present invention.

FIG. 10 is a flowchart illustrating an example of selecting storage resources. In particular, a method is presented for use in association with one or more functions and features described in conjunction with FIGS. 1-9, for execution by a dispersed storage and task (DST) client module that includes a processor or via another processing system of a dispersed storage network that includes at least one processor and memory that stores instruction that configure the processor or processors to perform the steps described below.

The method begins at step 1002, where a processing system (e.g., of a distributed storage and task (DST) client module) determines a storage unit performance level for storage units of a set of storage units, such as the set of DST execution units of FIG. 9. The determining can include at least one of interpreting an error message, performing a lookup, initiating a performance test, and/or interpreting a performance test result. The method continues at step 1004, where the processing system temporarily selects storage resources of the set of storage units based on the storage unit performance levels to produce identities of candidate primary storage slots. For example, the processing system selects an information dispersal algorithm (IDA) width number of storage resources associated with favorable storage unit performance levels. In particular, the temporarily selected IDA width number of storage resources can correspond to those of the set of storage units with most favorable performance levels and/or can select from a subset of the set of storage units with performance levels that are greater than a performance threshold level.

The method continues at step 1006, where the processing system exchanges identities of candidate primary storage slots with another processing system, for example, of another DST client device accessing the set of storage units. For example, the processing system sends the identities of the candidate primary storage slots and associated storage unit performance levels to the other processing system and receives identities of candidate primary storage slots selected by the other processing system. The method continues at step 1008, where the processing system coordinates selection of primary storage slots of the candidate primary storage slots with the other processing system to produce identities of selected primary storage slots. The selecting can be in accordance with a selection scheme, where the selection scheme includes one or more of selecting best performing storage units associated with a given processing module such as the processing system itself and/or the other processing system, splitting a number of co-selections, allowing selection of common storage units, and/or not allowing any selection of common storage units. The method continues at step 1010, where the processing system accesses data in the set of storage units using the selected primary storage slots. For example, the processing system sends requests (e.g., write, read, list, delete, etc.) to storage units associated with the selected primary storage slots and receives responses from at least some of the storage units associated with the selected primary storage slots.

In various embodiments, the data accessed using the selected primary storage slots includes a data segment, and the data segment was dispersed storage error encoded to produce a set of encoded data slices for storage in the selected primary storage slots. In various embodiments, the identities of the candidate primary storage slots are determined such that a decode threshold number of encoded data slices of the set of encoded data slices are available from any two operational sites when one of three total sites is unavailable.

In various embodiments, a set difference between a first set corresponding to the candidate primary storage slots and a second set corresponding to the selected primary storage slots is non-null. In various embodiments, determining the storage unit performance level for each storage unit of the set of storage units is based on a set of storage metrics determined for each storage unit. The set of storage metrics includes a bandwidth level the each storage unit, a storage latency level of the each storage unit, a retrieval latency level of the each storage unit, a transfer rate level of the each storage unit, a data retrieval reliability level of the each storage unit, and a data storage availability level of the each storage unit.

In various embodiments, the identities of candidate primary storage slots produced in temporarily selecting the storage resources corresponds to a subset of storage slots of a total set of storage slots of the set of storage units. In various embodiments, data is dispersed error encoded in the set of storage units in accordance with a set of dispersal parameters. The set of dispersal parameters includes an information dispersal algorithm (IDA) width number and a decode threshold number. The subset of storage slots includes at least a decode threshold number of storage slots and at most an IDA width number of storage slots. In various embodiments, the subset of storage slots includes exactly the IDA width number of storage slots, the subset of storage slots is selected from a set of possible subsets of storage slots, and each subset of storage slots of the set of possible subsets of storage slots includes exactly the IDA width number of storage slots. Each subset of storage slots of the set of possible subsets of storage slots is unique, and the set of possible subsets of storage slots includes a number of subsets of storage slots equal to a number of storage slots in the total set of storage slots choose the IDA width number of storage slots. In various embodiments, an average performance level is determined for the storage units of the set of storage units, and the subset of storage slots are each associated with storage units of the set of storage units with corresponding storage unit performance levels that are determined to be better than the average performance level.

In various embodiments, exchanging identities of candidate primary storage slots includes sending the identities of the candidate primary storage slots produced in temporarily selecting the storage resources to the other DST client module. Exchanging identities of candidate primary storage slots further includes receiving second identities of second candidate primary storage slots produced by the other DST client module from the other DST client module, where the other DST client module produces second identities of second selected primary storage slots based on the identities of the candidate primary storage slots.

In various embodiments, the set of storage units collectively include a set of storage slots. A first subset of the set of storage slots corresponds to the candidate primary storage slots, and coordinating selection of primary storage slots includes performing a narrowing function on a first subset of storage slots by removing at least one storage slot of the first subset of storage slots based on the second identities of second candidate primary storage slots to produce the selected primary storage slots.

In various embodiments, a first subset of the set of storage slots corresponds to the candidate primary storage slots, a second subset of the set of storage slots corresponds to the second candidate primary storage slots, a third subset of storage slots corresponds to the selected primary storage slots, and a fourth subset of storage slots corresponds to the second selected primary storage slots. An intersection between the first subset and the second subset of the set of storage slots is non-null, and an intersection between the third subset and the fourth subset is null as a result of coordinating selection of primary storage slots.

In various embodiments, one of the set of storage slots is associated with one of the set of storage units. The one of the set of storage slots is included in the second candidate primary storage slots identified by the other DST client module and is not included in the candidate primary storage slots identified by the DST client module. The one of the set of storage slots is included in the selected primary storage slots for data access by the DST client module and is not included in the second candidate primary storage slots for data access by the other DST client module in response to the storage unit performance level determined by the DST client module for the one of the set of storage units being determined to be more favorable than a second storage unit performance level determined by the other DST client module for the one of the set of storage units in coordinating selection of primary storage slots.

In various embodiments, a non-transitory computer readable storage medium includes at least one memory section that stores operational instructions that, when executed by a processing system of a dispersed storage network (DSN) that includes a processor and a memory, causes the processing system to determine a storage unit performance level for storage units of a set of storage units. Storage resources of the set of storage units are temporarily selected based on the storage unit performance levels to produce identities of candidate primary storage slots. Identities of candidate primary storage slots are exchanged with another non-transitory computer readable storage medium, such as another DST client module. Selection of primary storage slots of the candidate primary storage slots is coordinated with the other non-transitory computer readable storage medium to produce identities of selected primary storage slots. Data stored in the set of storage units is accessed using the selected primary storage slots.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%).

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing system", "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing system, and/or processing unit may be, or further include, memory and/or an integrated memory element, which may be a single memory device, a plurality of memory devices, and/or embedded circuitry of another processing module, module, processing circuit, processing system, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing system, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing system, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing system, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a dispersed storage and task (DST) client module that includes a processor, the method comprises:
    determining a storage unit performance level for storage units of a set of storage units;
    temporarily selecting storage resources of the set of storage units based on the storage unit performance levels to produce identities of candidate primary storage slots;
    exchanging identities of candidate primary storage slots with another DST client module;
    coordinating selection of primary storage slots of the candidate primary storage slots with the another DST client module to produce identities of selected primary storage slots; and
    accessing data stored in the set of storage units using the selected primary storage slots.

2. The method of claim 1, wherein the data accessed using the selected primary storage slots includes a data segment, and wherein the data segment was dispersed storage error encoded to produce a set of encoded data slices for storage in the selected primary storage slots.

3. The method of claim 2, wherein the identities of the candidate primary storage slots are determined such that a decode threshold number of encoded data slices of the set of encoded data slices are available from any two operational sites when one of three total sites is unavailable.

4. The method of claim 1, wherein a set difference between a first set corresponding to the candidate primary storage slots and a second set corresponding to the selected primary storage slots is non-null.

5. The method of claim 1, wherein determining the storage unit performance level for each storage unit of the set of storage units is based on a set of storage metrics determined for the each storage unit, and wherein the set of storage metrics includes a bandwidth level the each storage unit, a storage latency level of the each storage unit, a retrieval latency level of the each storage unit, a transfer rate level of the each storage unit, a data retrieval reliability level of the each storage unit, and a data storage availability level of the each storage unit.

6. The method of claim 1, wherein the identities of candidate primary storage slots produced in temporarily selecting the storage resources corresponds to a subset of storage slots of a total set of storage slots of the set of storage units.

7. The method of claim 6, wherein data is dispersed error encoded in the set of storage units in accordance with a set of dispersal parameters, wherein the set of dispersal parameters includes an information dispersal algorithm (IDA) width number and a decode threshold number, and wherein the subset of storage slots includes at least a decode threshold number of storage slots and at most an IDA width number of storage slots.

8. The method of claim 7, wherein the subset of storage slots includes exactly the IDA width number of storage slots, wherein the subset of storage slots is selected from a set of possible subsets of storage slots, wherein each subset of storage slots of the set of possible subsets of storage slots includes exactly the IDA width number of storage slots, wherein each subset of storage slots of the set of possible subsets of storage slots is unique, and wherein the set of possible subsets of storage slots includes a number of subsets of storage slots equal to a number of storage slots in the total set of storage slots choose the IDA width number of storage slots.

9. The method of claim 7, further comprising determining an average performance level for the storage units of the set of storage units, wherein the subset of storage slots are each associated with storage units of the set of storage units with corresponding storage unit performance levels that are determined to be better than the average performance level.

10. The method of claim 1, wherein exchanging identities of candidate primary storage slots includes sending the identities of the candidate primary storage slots produced in temporarily selecting the storage resources to the another DST client module, wherein exchanging identities of candidate primary storage slots further includes receiving second identities of second candidate primary storage slots produced by the another DST client module from the another DST client module, and wherein the another DST client module produces second identities of second selected primary storage slots based on the identities of the candidate primary storage slots.

11. The method of claim 10, wherein the set of storage units collectively include a set of storage slots, wherein a first subset of the set of storage slots corresponds to the candidate primary storage slots, and wherein coordinating selection of primary storage slots includes performing a narrowing function on a first subset of storage slots by removing at least one storage slot of the first subset of storage slots based on the second identities of second candidate primary storage slots to produce the selected primary storage slots.

12. The method of claim 10, wherein the set of storage units collectively include a set of storage slots, wherein a first subset of the set of storage slots corresponds to the candidate primary storage slots, wherein a second subset of the set of storage slots corresponds to the second candidate primary storage slots, wherein a third subset of storage slots corresponds to the selected primary storage slots, wherein a fourth subset of storage slots corresponds to the second selected primary storage slots, wherein an intersection between the first subset and the second subset of the set of storage slots is non-null, and wherein an intersection between the third subset and the fourth subset is null as a result of coordinating selection of primary storage slots.

13. The method of claim 10, wherein the set of storage units collectively include a set of storage slots, wherein one of the set of storage slots is associated with one of the set of storage units, wherein the one of the set of storage slots is included in the second candidate primary storage slots identified by the another DST client module and is not included in the candidate primary storage slots identified by the DST client module, and wherein the one of the set of storage slots is included in the selected primary storage slots for data access by the DST client module and is not included in the second candidate primary storage slots for data access by the another DST client module in response to the storage unit performance level determined by the DST client module for the one of the set of storage units being determined to be more favorable than a second storage unit performance level determined by the another DST client module for the one of the set of storage units in coordinating selection of primary storage slots.

14. A processing system of a dispersed storage and task (DST) client module comprises:
   at least one processor;
   a memory that stores operational instructions, that when executed by the at least one processor cause the processing system to:
      determine a storage unit performance level for storage units of a set of storage units;
      temporarily select storage resources of the set of storage units based on the storage unit performance levels to produce identities of candidate primary storage slots;
      exchange identities of candidate primary storage slots with another DST client module;
      coordinate selection of primary storage slots of the candidate primary storage slots with the another DST client module to produce identities of selected primary storage slots; and
      access data stored in the set of storage units using the selected primary storage slots.

15. The processing system of claim 14, wherein the data accessed using the selected primary storage slots includes a data segment, and wherein the data segment was dispersed storage error encoded to produce a set of encoded data slices for storage in the selected primary storage slots.

16. The processing system of claim 14, wherein a set difference between a first set corresponding to the candidate primary storage slots and a second set corresponding to the selected primary storage slots is non-null.

17. The processing system of claim 14, wherein exchanging identities of candidate primary storage slots includes sending the identities of the candidate primary storage slots produced in temporarily selecting the storage resources to the another DST client module, wherein exchanging identities of candidate primary storage slots further includes receiving second identities of second candidate primary storage slots produced by the another DST client module from the another DST client module, and wherein the another DST client module produces second identities of second selected primary storage slots based on the identities of the candidate primary storage slots.

18. The processing system of claim 17, wherein the set of storage units collectively include a set of storage slots, wherein a first subset of the set of storage slots corresponds to the candidate primary storage slots, wherein a second subset of the set of storage slots corresponds to the second candidate primary storage slots, wherein a third subset of storage slots corresponds to the selected primary storage slots, wherein a fourth subset of storage slots corresponds to the second selected primary storage slots, wherein an intersection between the first subset and the second subset of the set of storage slots is non-null, and wherein an intersection between the third subset and the fourth subset is null as a result of coordinating selection of primary storage slots.

19. The processing system of claim 17, wherein the set of storage units collectively include a set of storage slots, wherein one of the set of storage slots is associated with one of the set of storage units, wherein the one of the set of storage slots is included in the second candidate primary storage slots identified by the another DST client module and is not included in the candidate primary storage slots identified by the DST client module, and wherein the one of the set of storage slots is included in the selected primary storage slots for data access by the DST client module and is not included in the second candidate primary storage slots for data access by the another DST client module in response to the storage unit performance level determined by the DST client module for the one of the set of storage units being determined to be more favorable than a second storage unit performance level determined by the another DST client module for the one of the set of storage units in coordinating selection of primary storage slots.

20. A computer readable storage medium comprises:
   at least one memory section that stores operational instructions that, when executed by a processing system of a dispersed storage network (DSN) that includes a processor and a memory, causes the processing system to:
      determine a storage unit performance level for storage units of a set of storage units;
      temporarily select storage resources of the set of storage units based on the storage unit performance levels to produce identities of candidate primary storage slots;
      exchange identities of candidate primary storage slots with another computer readable storage medium;
      coordinate selection of primary storage slots of the candidate primary storage slots with the another DST client module to produce identities of selected primary storage slots; and
      access data stored in the set of storage units using the selected primary storage slots.

* * * * *